June 12, 1956 — D. B. HAAGENSEN — 2,750,506
HIGH-FREQUENCY MODULATION SYSTEMS
Filed March 26, 1953
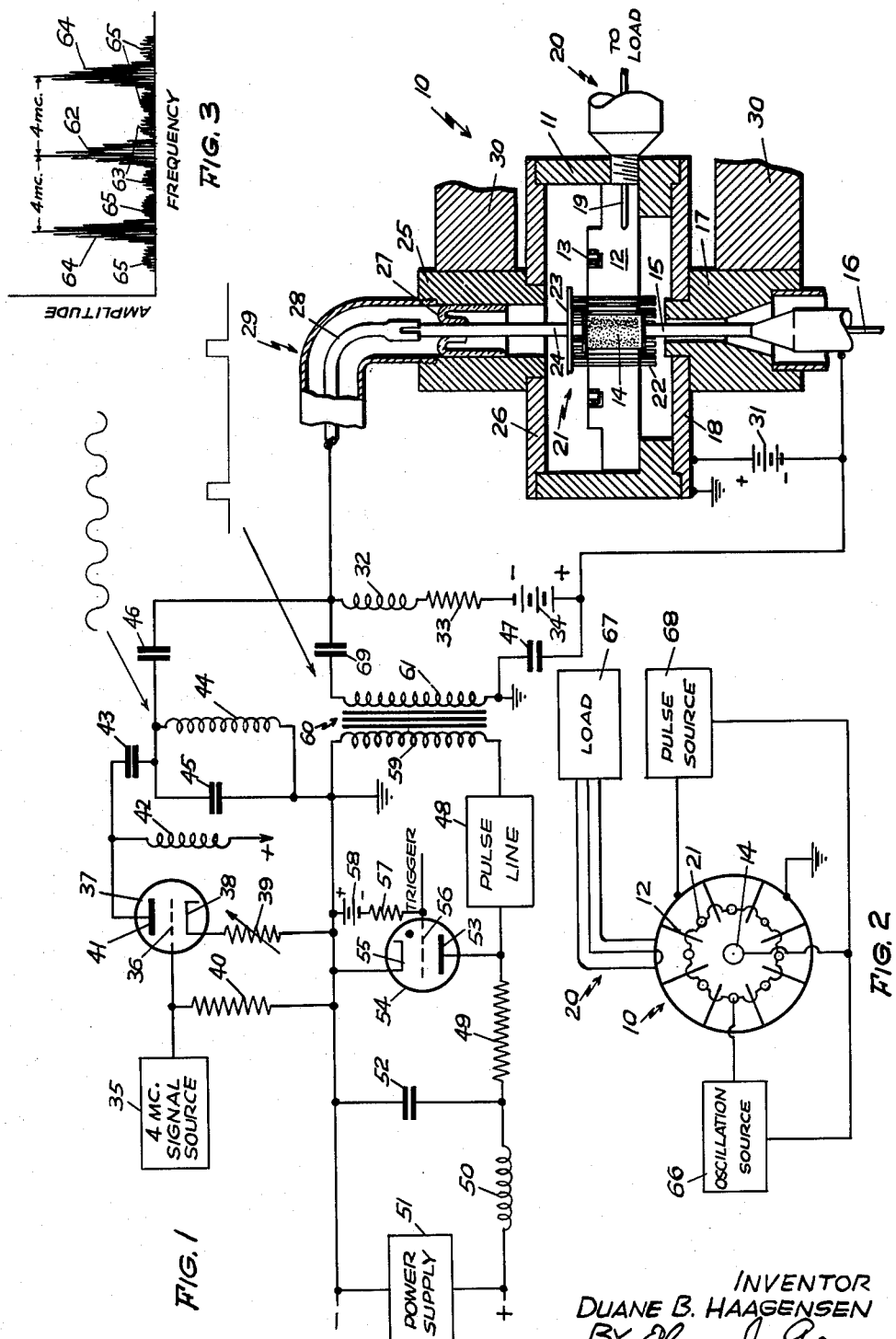
INVENTOR
DUANE B. HAAGENSEN
BY Elmer J. Gorn
ATTORNEY

United States Patent Office 2,750,506
Patented June 12, 1956

2,750,506

HIGH-FREQUENCY MODULATION SYSTEMS

Duane B. Haagensen, Wayland, Mass., assignor to Raytheon Manufacturing Company, Newton, Mass., a corporation of Delaware Application March 26, 1953, Serial No. 344,852

7 Claims. (Cl. 250—36)

This invention relates to electron discharge systems and more particularly to systems employing high-frequency oscillation generators of the magnetron type.

In many high-frequency communications and navigation systems, it is desirable to transmit a plurality of discrete signals spaced by a predetermined frequency. For example, a radar system wherein the transmitted pulse was simultaneously transmitted on a plurality of discrete frequencies spaced apart by a predetermined amount would be less susceptible to jamming than conventional radar systems. Similarly, communication systems wherein substantially the same intelligence was transmitted on a plurality of discretely-spaced frequency signals could be made less susceptible to interference and, indeed, secrecy communication systems could be employed wherein the invention is broken down into a plurality of separate groups of information with the separate groups of information being transmitted over different carrier signals spaced from each other by a predetermined amount.

Due to the fact that frequency stabilization of generators in the higher frequency bands, such as the mircowave region, is relatively poor, it has been heretofore difficult to obtain a plurality of signals discretely spaced in frequency by a predetermined amount, for example, a few megacycles.

This invention discloses that a grid-controlled magnetron may be made to generate simultaneously a plurality of discretely-spaced frequencies. Briefly, this is accomplished by utilizing a grid-controlled magnetron, which may be of the type disclosed in my copending application, Serial No. 334,214, filed January 30, 1953, and by applying to the grid thereof a signal whose frequency is substantially equal to the desired spacing between the discrete output frequencies of the magnetron. The output frequencies will include the carrier signal frequencies as well as the sum and difference frequencies of the carrier. The amplitude of the sum and difference frequencies with respect to the carrier may be adjusted by adjusting the amplitude of the input signal to the grid. In addition, the amplitudes of the output signals may be simultaneously modulated by the application of an intelligence modulating signal to the grid of the magnetron. In the case of a pulse radar application, the pulse intelligence modulating signal would be in the form of a pulse of short duration, for example, one microsecond or less, and the bias voltage applied to the grid could be adjusted such that, in the absence of the pulse, the magnetron could be entirely cut off and would not oscillate.

This invention further discloses that, in the case of pulse modulation, the modulating signal could be applied to the anode-cathode circuit of the magnetron, as in conventional pulsed magnetron techniques currently in use, while the signal used to produce the side bands could be applied to the grid.

Other and further objects and advantages of this invention will become apparent as the description thereof progresses, reference being had to the accompanying drawings wherein:

Fig. 1 illustrates a schematic diagram of a grid magnetron modulation circuit embodying this invention;

Fig. 2 illustrates a block diagram of a further embodiment of the invention; and Fig. 3 illustrates a graph indicating the frequency content of the output to the load of the systems shown in Figs. 1 or 2.

Referring now to Fig. 1, there is shown a grid-controlled magnetron 10 of the type described in my aforementioned copending application wherein an anode cylinder 11 has a plurality of anode members 12 extending radially inwardly from the inner surface thereof. Anode members 12 are alternately connected on their upper edges adjacent their inner ends by a pair of conductive straps 13. However, it is to be clearly understood that this invention contemplates the possibility of using an unstrapped grid-controlled magnetron. Positioned in the space defined by the inner ends of anode members 12 is a cathode 14 supported by a lead-in structure 15 comprising a hollow rod containing a filament lead-in member 16. Members 15 and 16 extend downwardly from cathode 14 through an aperture in a lower magnetic pole piece 17, sealed to a lower end plate 18, sealed to the lower end of cylinder 11, and terminate in insulating seals, not shown, in accordance with well-known practice. An output-coupling loop 19 has one end thereof attached to cylinder 11 and the other end thereof attached to the central conductor of a coaxial line 20 which extends outwardly through cylinder 11. The inner and outer conductors of the coaxial line 20 are sealed by an insulating seal and are used to couple energy to any desired load, such as the antenna of a radar or communications system.

Positioned adjacent the anode members 12, outside the paths of electrons flowing from the cathode 14 to the anode members 12, is a grid structure 21 comprising a plurality of wires 22 extending downwardly between the tips of the anode members 12 parallel with the axis of cylinder 11. Grid wires 22 are attached at their upper ends to a grid support plate 23, which, in turn, is attached to a metallic support member 24, which extends outwardly through an aperture in an upper magnetic pole piece 25 sealed into an upper end plate which, in turn, closes the upper end of cylinder 11. A ceramic seal 27 is provided between the support member 24 and the pole piece 25. Support member 24 is connected to the central conductor 28 of a coaxial line 29 whose outer conductor engages the aperture in pole piece 27.

A magnetic field is produced across the gap between pole pieces 25 and 17 in the region between the cathode 14 and the anode members 12 by means of a permanent magnet 30 engaging pole pieces 25 and 17. A suitable anode potential is applied between the cathode 14 and the anode members 12 by means of a battery 31. A suitable bias is applied to the grid 21 by connecting the central conductor 28 of the coaxial line 29 through a grid load inductance 32, a grid load resistance 33 and a bias battery 34, all in series, to the cathode support structure 15. The size of the battery 34 is of sufficient magnitude to bias the grid 24 sufficiently negative with respect to the cathode 14 to cut off the grid-controlled magnetron 10, that is, to prevent the generation of oscillations therein.

A source of high-frequency oscillations, for example, four megacycles, is applied to the grid-controlled magnetron by connecting a signal source 35 to the grid 36 of a triode 37. The cathode 38 of triode 37 is connected to ground through a variable bias resistor 39, and the grid 36 of triode 37 is connected to ground through grid load resistor 40. The anode 41 of triode 37 is connected to B+ through a plate load inductance 42 and through a shunt feed condenser 43 to a tank circuit comprising an inductance 44 and condenser 45 connected in parallel to ground. The junction between shunt feed condenser 43 and the tank circuit comprising inductance 44 and condenser 45 is connected through a coupling condenser 46 to central conductor 28 of coaxial line 29.

The cathode 14 is connected to ground by means of support member 15 through an R. F. by-pass condenser 47 such that the amplified output signal from the source 35 is effectively connected between the grid 21 and the R. F. ground reference potential comprising the anode and cathode structures. When the potential of grid 21 is sufficiently high to allow the magnetron 10 to oscillate, the four megacycle signals of the sources 35 applied to the grid 21 causes upper and lower side bands of the oscillation frequency to occur in the signal fed through the output line 20 to the load. The magnitude of the side-band signals relative to the carrier is determined by the amplitude of the signal fed to the grid 21. In general, the amplitude of the side bands increases with increase in amplitude of the four megacycle signal applied to the grid 21.

The output of the magnetron 10 may also be modulated, for example, by a pulse modulator. The pulse modulator may be any desired modulator, and, as shown here, comprises a pulse-line charging network wherein a pulse-line 48, made up, for example, of a pulse-shaping network utilizing inductors and capacitors, has one end thereof connected through a charge-rate limiting resistor 49 and an inductance 50 to the positive side of a power supply 51. The negative side of power supply 51 is connected to ground and the junction between the inductance 50 and resistor 49 is connected to ground through a condenser 52. The junction between the pulse-line 48 and the resistor 49 is connected to the anode 53 of a grid-controlled gas tube 54 whose cathode 55 is connected to ground. The grid 56 of tube 54 is connected to ground through a grid load resistor 57 and a bias battery 58, which maintains the gas tube 54 cut off until triggered by an input trigger signal applied to the grid 56. The opposite end of pulse-line 48 from that connected to resistor 49 is connected to the primary winding 59 of a pulse transformer 60, the other end of winding 59 being connected to ground. The secondary winding 61 of pulse transformer 60 has one end thereof connected to ground and the other end thereof connected through coupling condenser 69 to the central conductor 28 of line 29. As the pulse-line 48 charges up through resistor 49, the gas tube 54 is prevented from firing due to the negative bias voltage applied to the grid 56 by bias battery 58. However, upon application of a positive trigger signal to the grid 56, the gas tube 54 fires, thereby discharging the pulse-line 48 through the transformer primary winding 49, causing an output pulse from the transformer secondary winding 61, which is effectively applied to the grid 21 through the grid support 24 and central conductor 28 of coaxial line 29.

Winding 61 is connected such that the pulse applied to the grid 21 is positive, causing the magnetron to oscillate for the duration of the pulse. The result is a burst for output energy for the duration of the pulse which contains the carrier frequency plus side bands due to the modulation by the pulse as well as the sum and difference frequencies of the four megacycle signals and the carrier along with the pulse side bands of said sum and difference frequencies.

Referring now to Fig. 3, there is shown a diagram of amplitude versus frequency for the output of the magnetron 10. Plotted along the axis of abscissas is the frequency, while plotted along the axis of ordinates is amplitude. The carrier frequency is illustrated at 62 along with the side bands 63 due to the pulse applied to the grid from the pulse line 48. Spaced four megacycles on either side of the carrier 62 are the upper and lower side bands 64 representing the sum and difference frequencies of the carrier and the four megacycle signals applied to the grid 21 from the source 35. The sum and difference signals 64 each have their own side bands 65 due to the pulse applied to the grid 21 from the line 48.

Referring now to Fig. 2, there is shown diagrammatically a grid-controlled magnetron 10 having anode members 12, grid structure 21 and a cathode 14. The anode structure is connected to ground and is connected to the ground side of an oscillation source 66, which may be, for example, the signal source 35, amplifier 37 and associated circuitry illustrated in Fig. 1. Also included in oscillation source 66 may be the bias voltage arrangement comprising the battery 34 and the grid load impedance comprising the inductance 32 and the resistor 33 illustrated in Fig. 2. The output line 20 of a magnetron 10 is connected to a load illustrated at 67 and the cathode 14 is connected to one side of a pulse source 68, the other side of which is connected to ground, which comprises the anode of the magnetron 10. The pulse source 68 may be any of the well-known pulse sources used for pulse modulating magnetrons. One type of pulse source is that illustrated in Fig. 1 utilizing the elements 48 through 61. The output frequency spectrum applied to the load 67 with this arrangement will be substantially the same as that for Fig. 1, as illustrated in Fig. 3.

This completes the description of the embodiments of the invention illustrated herein. However, many modifications will be apparent to persons skilled in the art without departing from the spirit and scope of this invention. For example, other types of modulating circuits may be used to apply the signals to the grid of the grid-controlled magnetron. Other types of microwave oscillation generators, such as backward wave oscillators, may be substituted for the particular magnetron structure described herein and the bias and anode voltage supplies disclosed herein may be varied dependent upon the spacing and shape of the various electrodes of the tube 10. Specifically, the grid 21 may be normally biased positive with respect to the cathode 14 for some positionings of the grid structure while still causing the tube to be cut off. Accordingly, it is desired that this invention be not limited by the particular details of the embodiments disclosed herein except as defined by the appended claims.

What is claimed is:

1. An electron discharge system comprising an electron-discharge tube having an electron source, a signal wave transmission network comprising a plurality of anode members spaced from said source, apparatus for directing electrons along paths adjacent said network, a control electrode structure positioned adjacent said network substantially outside said paths, and means for causing said electron discharge tube to generate simultaneously a plurality of output signals of discretely spaced frequencies in response to an input signal applied to said control electrode, the frequency of said signal being substantially equal to the desired frequency spacing between said discrete output signals.

2. An electron discharge system comprising an electron-discharge tube having an electron source, a signal wave transmission network comprising a plurality of anode members spaced from said source, apparatus for directing electrons along paths adjacent said network comprising a magnetic field-producing structure, a control electrode structure positioned adjacent said network substantially outside said paths and intermediate said anode members, and means for causing said electron discharge tube to generate simultaneously a plurality of output signals of discretely spaced frequencies in response to an input signal applied to said control electrode, the frequency of said signal being substantially equal to the desired frequency spacing between said discrete output signals.

3. An electron discharge system comprising a magnetron oscillator device having a cathode, an anode and a control electrode positioned farther from said cathode than the portions of said anode closest to said cathode, means for causing said oscillator device to generate simultaneously a plurality of output signals of discretely spaced frequencies in response to an input signal applied to said control electrode, the frequency of said signal being substantially equal to the desired frequency spacing between said discrete output signals, and a circuit for pulsing said device to produce intermittent operation thereof.

4. An electron discharge system comprising a magnetron oscillator device having a cathode, an anode and a control electrode, means for causing said oscillator device to generate simultaneously a plurality of output signals of discretely spaced frequencies in response to an input signal applied to said control electrode, the frequency of said signal being substantially equal to the desired frequency spacing between said discrete output signals, and a circuit for pulsing the control electrode of said device to produce intermittent operation thereof.

5. An electron discharge system comprising a magnetron oscillator device having a cathode, an anode and a control electrode positioned farther from said cathode than the portions of said anode closest to said cathode, means for causing said oscillator device to generate simultaneously a plurality of output signals of discretely spaced frequencies in response to an input signal applied to said control electrode, the frequency of said signal being substantially equal to the desired frequency spacing between said discrete output signals, and a circuit for pulsing the anode-cathode circuit of said device to produce intermittent operation thereof.

6. An electron discharge system comprising a magnetron oscillator device having a cathode, an anode and a control electrode positioned farther from said cathode than the portions of said anode closest to said cathode, means for causing said oscillator device to generate simultaneously a plurality of output signals of discretely spaced frequencies in response to a source of oscillations coupled to the control electrode of said device, the frequency of said oscillations being substantially equal to the desired frequency spacing between said discrete output signals, and a circuit for pulsing said device to produce intermittent operation thereof.

7. An electron discharge system comprising a magnetron oscillator device having a cathode, an anode and a control electrode, means for causing said oscillator device to generate simultaneously a plurality of output signals of discretely spaced frequencies in response to a source of oscillations coupled to the control electrode of said device, the frequency of said oscillations being substantially equal to the desired frequency spacing between said discrete output signals, and a circuit for pulsing the control electrode of said device to produce intermittent operation thereof.

References Cited in the file of this patent

UNITED STATES PATENTS

| Number | Name | Date |
|---|---|---|
| 2,217,745 | Hansell | Oct. 15, 1940 |
| 2,504,739 | Shoupp | Apr. 18, 1950 |
| 2,538,087 | Derby | Jan. 16, 1951 |
| 2,556,181 | Hansen | June 12, 1951 |
| 2,576,108 | Engelmann | Nov. 27, 1951 |
| 2,590,373 | Bradley | Mar. 25, 1952 |
| 2,590,612 | Hansell | Mar. 25, 1952 |